United States Patent [19]
Rintala

[11] Patent Number: 5,683,027
[45] Date of Patent: Nov. 4, 1997

[54] APPARATUS FOR ADJUSTMENT OF A POSITIONING DEVICE FOR METAL SHEETS IN CONNECTION WITH WELDING

[75] Inventor: Martti Rintala, Olofström, Sweden

[73] Assignee: AB Volvo, Gothenburg, Sweden

[21] Appl. No.: 564,074

[22] PCT Filed: May 25, 1994

[86] PCT No.: PCT/SE94/00492

§ 371 Date: Jul. 1, 1996

§ 102(e) Date: Jul. 1, 1996

[87] PCT Pub. No.: WO94/29074

PCT Pub. Date: Dec. 22, 1994

[30] Foreign Application Priority Data

Jun. 11, 1993 [SE] Sweden ................ 9302007

[51] Int. Cl.⁶ .................................... B23K 37/04
[52] U.S. Cl. .......................... 228/49.4; 228/6.1
[58] Field of Search ............ 228/41, 5.7, 6.1, 228/44.3, 49.4

[56] References Cited

U.S. PATENT DOCUMENTS

| | | | |
|---|---|---|---|
| 3,647,130 | 3/1972 | Hahne | 228/6.1 |
| 5,536,915 | 7/1996 | Peru et al. | 228/49.4 |

FOREIGN PATENT DOCUMENTS

| | | | |
|---|---|---|---|
| 829386 | 5/1981 | Russian Federation | 228/49.4 |

Primary Examiner—Samuel M. Heinrich
Attorney, Agent, or Firm—Rader, Fishman, Grauer & McGarry

[57] ABSTRACT

The object forming the basis of the present invention is attained if the apparatus disclosed by way of introduction is characterized in that the one support member is shiftably disposed and connected with an advancement device in order to execute an advancement movement for the sheets; that the second support member is stationary but connected to an adjustment arrangement, which is disposed to realise adjustment of the second support member in a direction substantially parallel with the direction of advancement; and that the welding device is movable towards and away from the joint region in a direction which is transversely directed to the direction of advancement.

18 Claims, 1 Drawing Sheet

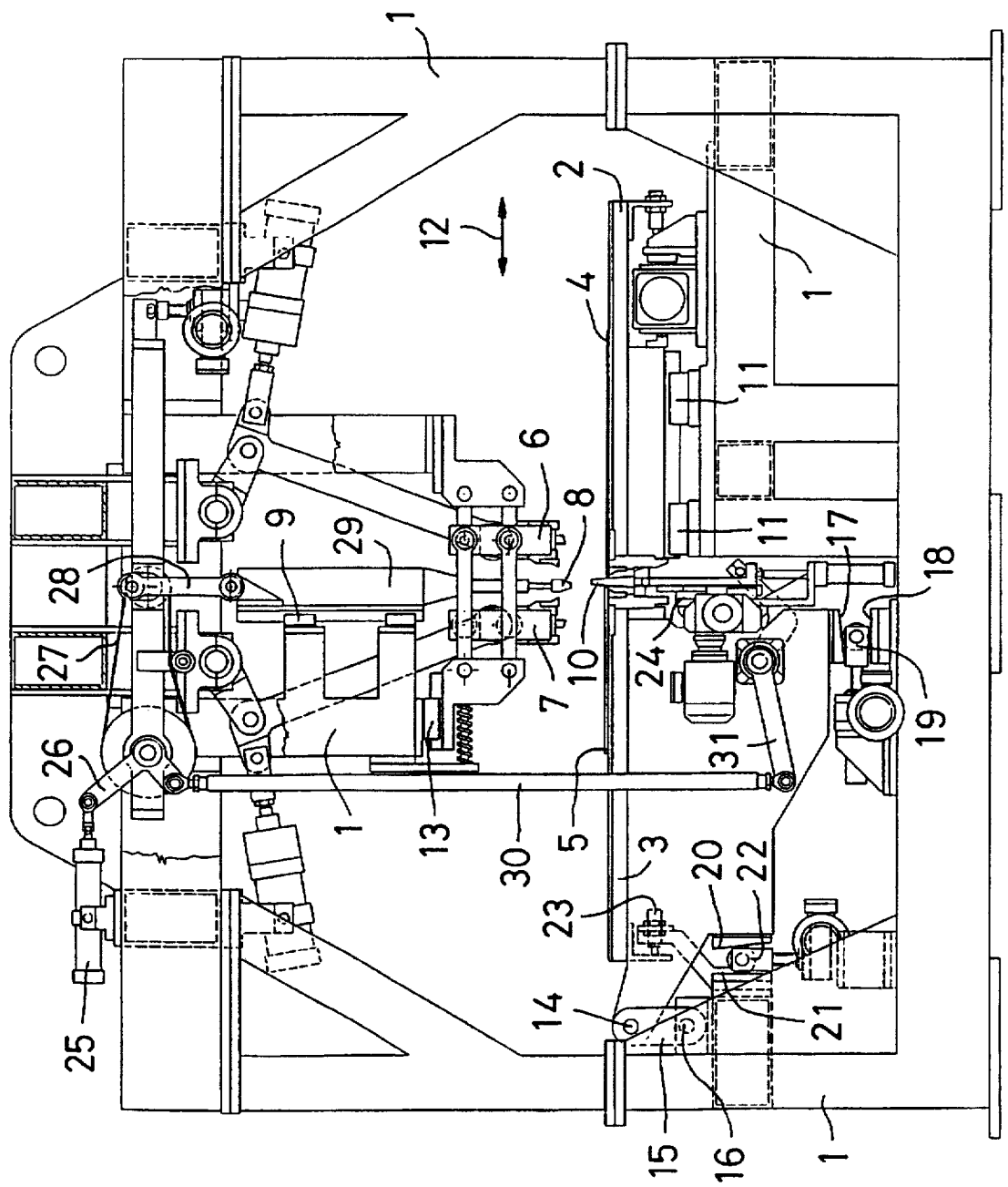

APPARATUS FOR ADJUSTMENT OF A POSITIONING DEVICE FOR METAL SHEETS IN CONNECTION WITH WELDING

TECHNICAL FIELD

The present invention relates to an apparatus for fusing together two metal sheets along a joint by welding, and comprises support members for the sheets, retainer devices for positionally fixing the sheets in relation to the support members, these being movable in relation to one another for advancing the sheets at and during the welding process, and a welding device which is arranged to heat the metal sheets to the welding temperature in the joint region.

BACKGROUND ART

Increasingly far-reaching demands are placed in the automotive industry on the possibility of employing rational welding processes to fuse together sheet metal parts which later constitute the blanks in a pressing process. By such means, considerable material waste is avoided in that the blank may be given a configuration which corresponds to that of the finished part. Those blanks which are under consideration here may many times consist of sheet metal materials of different thicknesses, and the sheet material may have different types of surface coatings. In such instance, it is then important that the surface coatings are damaged as little as possible, and that the effects of heat on the material are also kept within very narrow limits.

In blanks of different sheet metal thicknesses, it is also important that these may optionally be joined together in such a manner that the finished blank will have a planar underface, that the thickness difference is distributed on both sides of the thinnest sheet metal blank or that the blank has a planar upperface.

Laser welding has previously been tried in practical applications of the type under consideration here. This welding method results in superior quality because of welding in a butt joint. However, productivity is low and investment costs are so high that this method can only be employed in exceptional cases.

PROBLEM STRUCTURE

The present invention has for its object to realise an apparatus of the type disclosed by way of introduction, the apparatus being designed in such a manner that it, by correct adjustment, partly of the sheets mutually in relation to one another, and partly of the sheets in relation to the welding device, always gives a correct and high quality welding joint. In particular, the present invention has for its object to realise an apparatus which, in high productivity, is capable of realising adjustment of the metal sheets in a vertical direction in relation to one another, as well as adjustment of the joint in relation to the welding device in a direction which is transversely directed to the joint and parallel with the plane of extent of the metal sheets.

SOLUTION

The object forming the basis of the present invention is attained if the apparatus disclosed by way of introduction is characterized in that the one support member is shiftably disposed and connected with an advancement device in order to execute an advancement movement for the sheets; that the second support member is stationary but connected to an adjustment arrangement, which is disposed to realise adjustment of the second support member in a direction substantially parallel with the direction of advancement; and that the welding device is movable towards and away from the joint region in a direction which is transversely directed to the direction of advancement.

In one preferred embodiment, it suitably also applies according to the present invention that the adjustment apparatus is disposed to realise adjustment of the second support member in one direction which is transversely directed to its plane of extent.

BRIEF DESCRIPTION OF THE ACCOMPANYING DRAWING

The present invention will now be described in greater detail hereinbelow, with particular reference to the accompanying Drawing. This shows a vertical side elevation of the subject matter of the present invention.

DESCRIPTION OF PREFERRED EMBODIMENT

On the Drawing, reference numeral 1 relates to a frame for the apparatus according to the invention, reference numerals 2 and 3 to support members or tables for those sheets 4 and 5 which are to be welded. In the FIGURE, it should be observed that the sheets 4 and 5 are shown as being of different material thicknesses. For positionally fixing the metal sheets 4 and 5 on the tables 2 and 3, respectively, the apparatus according to the present invention is provided with retainer devices 6 and 7, respectively, which, from the positions illustrated in the FIGURE, are movable in a downward direction into abutment against the upper faces of the metal sheets 4 and 5 at the mutually facing edges of the tables 2 and 3.

The apparatus according to the present invention further includes a welding device 8 which, in the embodiment under consideration here, is designed as an induction device which, by induction, generates welding heat direct in the mutually facing edge regions of the sheets 4 and 5, simultaneously throughout the entire length of the welding joint along which the sheets are welded. The welding device 8 is disposed to be raisable and lowerable in a guide 9 in a part of the frame 1.

On insertion of the sheets 4 and 5 into the apparatus, the sheets are displaced to a position of arrest against at least two abutments 10 (of which only one is illustrated in the FIGURE), whereby the positions of the sheets 4 and 5 will be known in relation to the abutments 10. In this position, the retainer devices 6 and 7 are lowered and fixedly clamp the sheets against the subjacent tables 2 and 3.

In order to move together the mutually facing edges of the sheets 4 and 5 to the welding position, it is necessary first to displace the abutments 10 from the position illustrated in the FIGURE to downwardly drawn, passive positions beneath the tables 2 and 3. Once this has taken place, the one table 2, which is displaceably suspended in a guide 11, preferably a sliding guide in relation to a portion of the frame 1, is set in motion in an advancement movement in accordance with the arrow 12 substantially parallel with the plane of extent of the sheet 4 towards the second table 3 and the sheet 5 placed thereon. During this advancement movement, the one retainer device 6, which is displaceably suspended against spring action in a guide 13, accompanies the advancement movement 12 of the table 2. At the same time as the abutments 10 are lowered to the passive positions, the welding device 8 is also lowered to the welding position immediately above the joint between the metal sheets 4 and 5. Once the welding device 8 has been activated and brought the mutually facing edge regions of the metal sheets 4 and 5 to welding temperature, advancement of the first table 2 in a direction towards the second table continues so far that the sheets are pressed together in the welding phase. That length of advancement which is applicable during the welding process proper for closing the welding joint is of the order of magnitude of one or a few tenths of a millimetre, possibly one or a couple of millimetres.

During the above-described welding phase, and in relation to advancement movement 12, the second table 3 which supports the sheet 5 may be considered as stationary. However, in order to afford the possibility of welding of sheets of different thicknesses, and for placing sheets at heights in relation to one another in such a manner that the underfaces of the sheets can be planar after welding, that the difference in thickness between the sheets is distributed in a predetermined manner over the height of the joint, or that the upper face of the sheets is planar after the welding, at least that part of the second table 3 which is turned to face towards the first table 2 is, under the action of an adjustment device, adjustable in the vertical direction.

That end of the second table 3 facing away from the first table 2 is pivotally secured via a pivot 14 in a linkage 15 which, via a pivot 16, is pivotally secured in the frame 1. While only a single linkage 15 is shown in the FIGURE, it is assumed that at least two such linkages are provided, one on either side of the table 3.

As a result of the arrangement with the pivots 14 and 16 and the linkages 15, the second table may be raised and lowered at its end facing towards the first table. Further, the table 3 may also be displaced in its entirety towards and away from the first table 2 by pivoting of the linkage 15 about the pivot 16. These movement possibilities of the second table 3 take place while retaining good alignment of the table 3 where its edge facing towards the first table 2 is always parallel with the edge of the table.

In order to permit vertical adjustment of the second table 3, there is provided, in a region beneath this table and at its end facing towards the first table 2, an obliquely inclined surface 17 which, together with an adjustment surface 18 on the frame 1, forms a wedge-shaped adjustment space in which an adjustment body 19 is reciprocally movable. In the illustrated embodiment, the adjustment body 19 is designed as a roller, a wheel or a block which is movable reciprocally in the longitudinal direction of the wedge-shaped adjustment space between the adjustment surfaces 17 and 18.

That end of the second table 3 turned to face away from the first table 2 has an approximately vertical adjustment surface 20 which, together with a fixed adjustment surface 21 on the frame 1, forms a wedge-shaped adjustment space in which an adjustment body 22 is movable in the longitudinal direction. For returning the second table 3 in a direction away from the first table 2 so that contact is ensured between both of the adjustment surfaces 20 and 21, and the adjustment body 22 located therebetween, there is provided a spring or power actuation element 23 which strives to move the second table 3 away from the first in a direction which is approximately parallel with the plane of extent of the tables.

As was mentioned above, the subject matter of the present invention includes at least two abutments 10. These abutments 10 are carried by the second table 3 and are movable in the longitudinal direction of the joint between the sheets 4 and 5 via guides 24 whose direction of movement is, thus, parallel with the direction of the joint. Hereby, the positions of the abutments 10 may be set in response to the width of the different sheets 4 and 5 which are to be welded.

Since the abutments 10 are carried by the second, and adjustable table 3, the joint between the sheets will always be in the same position in relation to the second table. By adjustment of the second table 3, it is thus possible to displace the joint between the sheets 4 and 5 in the advancement direction 12 in one plane which is parallel with the plane of the sheets 4 and 5. Hereby, the joint can be placed more or less centrally straight beneath the welding device 8 so that, for example, the welding device may, in relative terms, be placed offset somewhat in over that sheet metal piece which is of the greater thickness if the sheets are not of equal thickness. By such a relative offset between the welding device and the joint, it is possible to ensure that heating takes place simultaneously and to the same level in both of the sheets which are being welded.

For driving the welding device 8 between the passive position illustrated on the Drawing and the welding position lowered to the joint region at the sheets 4 and 5, use is made of a prime mover 25 in the form of a cylinder unit which, via a crank arm 26, a chain or belt drive 27, and a crankshaft 28, actuates a carrier 29 for the welding device 8. While not being apparent from the Drawing, the vertical position of the welding device 8 is adjustable relative to the carrier 29, whereby the vertical position of the welding device in the welding position is adjustable in response to the thickness of the metal sheets 4 and 5 which are to be welded. In such instance, an adjustment is sought-for which entails that the distance between the welding device 8 and the upper faces of the sheets 4 and 5 will be as slight as possible, since energy losses will be minimized in this case.

It was mentioned above that the abutments 10 must be brought down to the passive positions located under the tables 2 and 3 before the welding device 8 could be lowered to the welding position and the table 2 be set in motion in the advancement movement according to the arrow 12. To this end, the prime mover 25 of the welding device 8 is mechanically connected to the abutments 10 for driving them so that a downwardly directed movement of the abutments 10 takes place synchronously with the downwardly directed movement of the welding device 8, and vice versa. The interconnection of the abutments 10 and the welding device 8 is realised in that the crank arm 26 is connected to a connecting rod 30 which, via a rocker 31, transfers the movements to the abutments 10.

The present invention may be modified without departing from the spirit and scope of the appended claims.

What is claimed is:

1. An apparatus for fusing together two metal sheets (4, 5) along a joint by welding, comprising support members (2, 3) for the sheets, retainer devices (6, 7) for positionally fixing the sheets in relation to the support members, these being movable in relation to one another for advancing the sheets at and during the welding process, and a welding device (8) which is arranged to heat the metal sheets to the welding temperature in the joint region, characterized in that the one support member (2) is shiftably disposed and connected with an advancement device in order to execute an advancement movement (12) for the sheets (4, 5); that the second support member (3) is stationary but connected to an adjustment arrangement (17–19; 20–22), which is disposed to realise adjustment of the second support member (3) in a direction substantially parallel with the direction of advancement (12); and that the welding device (8) is movable towards and away from the joint region in a direction which is transversely directed to the direction of advancement.

2. The apparatus as claimed in claim 1, characterized in that the adjustment arrangement (17–19; 20–22) is disposed to achieve adjustment of the second support member (3) also in a direction which is transversely directed in relation its plane of extent.

3. The apparatus as claimed in claim 1, characterized in that there is provided, in the region between adjacent edges of the support members (2, 3), an abutment member (10) against which the sheets (4, 5) are urgeable for determining their position prior to the advancement movement (12); that said abutment member is provided with an operating device by means of which it is movable, along a path of movement, away from the joint region; and that said path of movement is disposed to accompany the second support member (3) in its adjustment movements.

4. The apparatus as claimed in claim 3, characterized in that said abutment member (10) includes at least two abutments which are adjustable in an adjustment direction (24) along the joint between the sheets (4, 5).

5. The apparatus as claimed in claim 1, characterized in that in the region of the end of the second support (3) facing away from the joint region, there are pivotally secured therein linkage arms (15) which, with opposing end portions, are pivotally (14, 16) secured in a frame (1) for the apparatus, the linkage arms being approximately vertical and having pivot axes which are parallel with the longitudinal direction of the joint; and that there is formed, between mutually facing first adjustment surfaces (20, 21) on the second support member (3) and the frame (1), an elongated, wedge-shaped adjustment space in which there is disposed an adjustment element (22) which is movable in the longitudinal direction of the adjustment space transversely of the direction of advancement (12) of the first support member (2).

6. The apparatus as claimed in claim 1, characterized in that in the region at the end of the second support member (3) facing towards the joint, between mutually facing second adjustment surfaces (17, 18) on the support member (3) and a portion of a frame (1) for the apparatus located beneath this support member, there is formed a second, elongated and wedge-shaped adjustment space in which there is disposed an adjustment body (19) which is movable in the longitudinal direction of the adjustment space and substantially parallel with the direction of advancement (12) of the first support member (2).

7. The apparatus as claimed in claim 3, characterized in that the welding device (8) and the abutment member (10) are motionally interconnected and drivable by a common prime mover (25) for executing synchronous movements so that, when the welding device is moved towards the joint region, the abutment member is moved away therefrom, and vice versa.

8. The apparatus as claimed in claim 2 characterized in that there is provided, in the region between adjacent edges of the support members, an abutment member against which the sheets are urgeable for determining their position prior to the advancement movement; that said abutment member is provided with an operating device by means of which it is movable, along a path of movement, away from the joint region; and that said path of movement is disposed to accompany the second support member in its adjustment movements.

9. The apparatus as claimed in claim 2 characterized in that in the region of the end of the second support facing away from the joint region, there are pivotally secured therein linkage arms which, with opposing end portions, are pivotally secured in a frame for the apparatus, the linkage arms being approximately vertical and having pivot axes which are parallel with the longitudinal direction of the joint; and that there is formed, between mutually facing first adjustment surfaces, on the second support member and the frame, an elongated, wedge-shaped adjustment space in which there is disposed an adjustment element which is movable in the longitudinal direction of the adjustment space transversely of the direction of advancement of the first support member.

10. The apparatus as claimed in claim 3 characterized in that in the region of the end of the second support facing away from the joint region, there are pivotally secured therein linkage arms which, with opposing end portions, are pivotally secured in a frame for the apparatus, the linkage arms being approximately vertical and having pivot axes which are parallel with the longitudinal direction of the joint; and that there is formed, between mutually facing first adjustment surfaces, on the second support member and the frame, an elongated, wedge-shaped adjustment space in which there is disposed an adjustment element which is movable in the longitudinal of the adjustment space transversely of the direction of advancement of the first support member.

11. The apparatus as claimed in claim 4 characterized in that in the region of the end of the second support facing away from the joint region, there are pivotally secured therein linkage arms which, with opposing end portions, are pivotally secured in a frame for the apparatus, the linkage arms being approximately vertical and having pivot axes which are parallel with the longitudinal direction of the joint; and that there is formed, between mutually facing first adjustment surfaces, on the second support member and the frame, an elongated, wedge-shaped adjustment space in which there is disposed an adjustment element which is movable in the longitudinal direction of the adjustment space transversely of the direction of advancement of the first support member.

12. The apparatus as claimed in claim 2 characterized in that in the region at the end of the second support member facing towards the joint, between mutually facing second adjustment surfaces on the support member and a portion of a frame for the apparatus located beneath this support member, there is formed a second, elongated and wedge-shaped adjustment space in which there is disposed an adjustment body which is movable in the longitudinal direction of the adjustment space and substantially parallel with the direction of advancement of the first support member.

13. The apparatus as claimed in claim 3 characterized in that in the region at the end of the second support member facing towards the joint, between mutually facing second adjustment surfaces on the support member and a portion of a frame for the apparatus located beneath this support member, there is formed a second, elongated and wedge-shaped adjustment space in which there is disposed an adjustment body which is movable in the longitudinal direction of the adjustment space and substantially parallel with the direction of advancement of the first support member.

14. The apparatus as claimed in claim 4 characterized in that in the region at the end of the second support member facing towards the joint, between mutually facing second adjustment surfaces on the support member and a portion of a frame for the apparatus located beneath this support member, there is formed a second, elongated and wedge-shaped adjustment space in which there is disposed an adjustment body which is movable in the longitudinal direction of the adjustment space and substantially parallel with the direction of advancement of the first support member.

15. The apparatus as claimed in claim 5 characterized in that in the region at the end of the second support member facing towards the joint, between mutually facing second adjustment surfaces on the support member and a portion of a frame for the apparatus located beneath this support member, there is formed a second, elongated and wedge-shaped adjustment space in which there is disposed an adjustment body which is movable in the longitudinal direction of the adjustment space and substantially parallel with the direction of advancement of the first support member.

16. The apparatus as claimed in claim 4 characterized in that the welding device and the abutment member are motionally interconnected and drivable by a common prime mover for executing synchronous movements so that, when the welding device is moved towards the joint region, the abutment member is moved away therefrom, and vice versa.

17. The apparatus as claimed in claim 5 characterized in that the welding device and the abutment member are motionally interconnected and drivable by a common prime mover for executing synchronous movements so that, when the welding device is moved towards the joint region, the abutment member is moved away therefrom, and vice versa.

18. The apparatus as claimed in claim 6 characterized in that the welding device and the abutment member are motionally interconnected and drivable by a common prime mover for executing synchronous movements so that, when the welding device is moved towards the joint region, the abutment member is moved away therefrom, and vice versa.

* * * * *